United States Patent
Buckland et al.

(10) Patent No.: US 9,870,336 B2
(45) Date of Patent: *Jan. 16, 2018

(54) IMPLEMENTING SIDEBAND CONTROL STRUCTURE FOR PCIE CABLE CARDS AND IO EXPANSION ENCLOSURES

(71) Applicant: International Business Machines Corporation, Armonk, NY (US)

(72) Inventors: Patrick A. Buckland, Austin, TX (US); Jeffery D. Haumont, Rochester, MN (US); Gregory M. Nordstrom, Rochester, MN (US); William A. Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/628,203

(22) Filed: Feb. 20, 2015

(65) Prior Publication Data

US 2015/0286602 A1  Oct. 8, 2015

Related U.S. Application Data

(63) Continuation of application No. 14/243,999, filed on Apr. 3, 2014.

(51) Int. Cl.
*G06F 13/20* (2006.01)
*G06F 13/42* (2006.01)
*G06F 13/40* (2006.01)

(52) U.S. Cl.
CPC ...... *G06F 13/4221* (2013.01); *G06F 13/4081* (2013.01)

(58) Field of Classification Search
CPC ................. G06F 13/4221; G06F 13/4081
USPC ........................................... 710/313
See application file for complete search history.

(56) References Cited

U.S. PATENT DOCUMENTS

| | | | |
|---|---|---|---|
| 8,098,993 B2 | 1/2012 | Kirkpatrick et al. | |
| 8,359,415 B2 | 1/2013 | Brown et al. | |
| 8,463,952 B1 * | 6/2013 | Tracht ................ | G06F 11/2007 710/14 |
| 8,516,089 B2 | 8/2013 | Johnsen et al. | |

(Continued)

FOREIGN PATENT DOCUMENTS

WO  WO2010114910 A1  10/2010

OTHER PUBLICATIONS

Jun Suzuki et al., "Multi-Root Share of Single-Root I/O Virtualization (SR-IOV) Compliant PCI Express Device", 2010, 18th IEEE Symposium on High Performance Interconnects.

(Continued)

*Primary Examiner* — Chun-Kuan Lee
(74) *Attorney, Agent, or Firm* — Joan Pennington (57) ABSTRACT

A method, system and computer program product are provided for implementing sideband control structure for Peripheral Component Interconnect Express (PCIE) add-in cards, or cable cards, that utilize cables to connect to input/output (IO) expansion enclosures in a computer system. System firmware uniquely identifies a cable card present in a PCIE slot in a system unit. Enclosure management functions utilize sideband control paths integrated within at least cable providing sideband control signaling, and providing PCIE signaling lanes between the cable card and the IO enclosure.

10 Claims, 12 Drawing Sheets

(56) References Cited

U.S. PATENT DOCUMENTS

| | | | |
|---|---|---|---|
| 8,560,772 B1 | 10/2013 | Piszczek et al. | |
| 2003/0126346 A1* | 7/2003 | Kuo | G06F 13/409 710/311 |
| 2008/0126617 A1* | 5/2008 | Brownlow | G06F 9/5077 710/48 |
| 2009/0144731 A1 | 6/2009 | Freimuth et al. | |
| 2010/0312942 A1* | 12/2010 | Blinick | G06F 13/4022 710/316 |
| 2012/0033370 A1* | 2/2012 | Reinke | G06F 1/185 361/679.4 |
| 2013/0024742 A1 | 1/2013 | Nazarian et al. | |
| 2013/0227339 A1 | 8/2013 | Lund | |

OTHER PUBLICATIONS

External I/O Expansion Unit, Sun Oracle, pp. 1-4 http://www.oracle.com/us/sun/058287.pdf.

* cited by examiner

| Local FPGA Register | From/to |
|---|---|
| IO drawer PCIE Card Present | From Remote FPGA slot |
| CEC Cable Card Type | From Cable Card Strapping Pins |
| I2C address | To Local and Remote FPGA |
| I2C data | To/From Local and Remote FPGA |
| Cable card Low / High Byte Cable | From Cable Card Strapping Pins |
| Cable Card Low/High LED On/Off | To cable card link active LEDs |
| IO Drawer Low/High LED On/Off | To IO Drawer link active LEDs |
| IO BayPower Off/on | To IO drawer Remote FPGA |
| IO bay main power good | From IO drawer Remote FPGA |
| IO drawer main power good | From IO drawer Remote FPGA |
| IO drawer controller Status | From IO drawer Remote FPGA |
| IO drawer status alert | From IO drawer Remote FPGA |
| IO Bay Type | From IO Drawer Strapping Pins |
| IO Drawer Low / High Byte Cable | From IO Drawer Strapping Pins |
| IO Drawer Bay Number | From IO Drawer Strapping Pins |
| IO Drawer Bay Port Number | From IO Drawer Strapping Pins |
| IO Drawer Bay Type | From IO Drawer Strapping Pins |
| PCIE PERST to IO Drawer | To Remote FPGA |
| Remote FPGA Register | From/to |
| Data Buffer | To/From Local FPGA I2C or IO Drawer Controller I2C |

WHEN LINK AND HOST ARE TRAINED, IO DRAWER FPGA DEFAULTS TO DRIVING PERST UNTIL IT GETS WIRE DATA PACKET TO QUIT DRIVING PRST. IF IO DRAWER LOST PLL LOCK ON BOTH LINKS, IO DRAWER GOES TO POWER ON STATE, QUITS TRANSMITTING SYNCS AND DRIVES PERST. WHEN HOST LOST PLL SYNC ON ONE OF ITS RECEIVERS, LINK TRAINED STATUS BIT IS CLEARED FOR THAT LINK. 650

↓

RECEIVING A NACK ON EITHER SIDE, CAUSES THE LINK STATUS BIT TO BE CLEARED AND PACKET IS RESENT. WITH A WIRE DATA PACKET, FULL EXCHANGE IS PROVIDED BEFORE LINK IS TRAINED. IF AN I2C DATA PACKET, LINK GOES BACK TO TRAINED WHEN ACK IS RECEIVED. 652

↓

IO DRAWER FPGA DOES NOT SEND ANY PACKETS UNTIL A WIRE DATA PACKET IS RECEIVED FROM THE HOST. AFTER RESPONDING WITH ITS FIRST WIRE DATA PACKET, IO DRAWER FPGA SENDS A WIRE DATA PACKET ANY TIME ONE OF ITS WIRE INPUT CHANGE, AND RECEIVES AN ACK FROM HOST. 654

↓

POSITIVE ACK OF WIRE DATA FOR HOST CODE, WHEN PERST CHANGES LEVEL OR THERE IS I2C WIRTE TO ANY BITS THAT ARE IN WIRE DATA PACKET, HOST SENDS WIRE DATA PACKET AND CLEARS ITS LINK TRAINED BIT. WHEN IO DRAWER RECEIVES A GOOD WIRE PACKET, IT RESPONDS WITH AN ACK AND ITS WIRE DATA PACKET. 656

↓

WHEN HOST RECEIVES THE WIRE DATA PACKET FROM THE IO DRAWER, AND HAS SENT AN ACK, HOST SETS IT LINK TRAINED BIT. 658

IMPLEMENTING SIDEBAND CONTROL STRUCTURE FOR PCIE CABLE CARDS AND IO EXPANSION ENCLOSURES

This application is a continuation application of Ser. No. 14/243,999 filed Apr. 3, 2014.

FIELD OF THE INVENTION

The present invention relates generally to the data processing field, and more particularly, relates to a method, system and computer program product for implementing sideband control structure for Peripheral Component Interconnect Express (PCI-Express or PCIE) cable cards and input/output (IO) expansion enclosures in a computer system.

DESCRIPTION OF THE RELATED ART

Peripheral Component Interconnect Express (PCIE) has become the industry standard IO bus for server computer systems, as well as personal computers (PCs). Traditionally, servers install PCIE IO adapters (IOAs) in slots within a system unit that connect through a PCI host bridge to the system memory and processor buses. IBM POWER and Z series systems have offered external IO enclosures to provide additional PCIE slots beyond those that are available within the system unit. These have in the past been connected to the system unit through IBM proprietary interconnect architectures such as HSL and Infiniband 12× IO loops on IBM POWER systems.

A need exists to provide an external IO expansion enclosure utilizing PCIE slots in a system unit to connect via one or more cables to PCIE slots in the external IO expansion enclosure that provides additional PCIE slots, where the cable between the PCIE card in the system unit and an IO module within the external IO enclosure provides, for example, 16 lanes of PCI-Express bus, used for normal, standard PCIE configuration and IO transfer operations. A need exists to provide a system unit and a programmed management controller (a Chassis Management Controller, or CMC) for providing functions of detecting cable types and connection topologies to the IO enclosure; controlling power off/on of the IO enclosure, or components within the drawer, via system software; detecting and reporting exception and error conditions within the enclosure, determining component types and manufacturing information for components within the drawer, and the ability to download and update firmware in that controller or CMC. Consequently, an additional sideband communications mechanism is needed, outside of PCIE, between firmware or software running in the system unit and the management controller or other hardware within the enclosure.

SUMMARY OF THE INVENTION

Principal aspects of the present invention are to provide a method, system and computer program product for implementing sideband control structure for Peripheral Component Interconnect Express (PCIE) add-in cards, or cable cards, that utilize cables to connect to input/output (IO) expansion enclosures in a computer system. Other important aspects of the present invention are to provide such method, system and computer program product substantially without negative effects and that overcome many of the disadvantages of prior art arrangements.

In brief, a method, system and computer program product are provided for implementing sideband control structure for Peripheral Component Interconnect Express (PCIE) cable cards and input/output (IO) expansion enclosures in a computer system. System firmware uniquely identifies a cable card present in a PCIE slot in a system unit. Enclosure management functions utilize sideband control paths integrated within at least cable providing sideband control signaling, and providing PCIE signaling lanes between the cable card and the IO enclosure.

In accordance with features of the invention, a pair of cables advantageously provides redundancy for both the PCIE link and the sideband control path, in the event of failures of one cable.

In accordance with features of the invention, system firmware configures the PCIE slot when first initializing the PCIE slot in the system unit, both at system initial program load (IPL) time and at PCIE hot plug power on.

In accordance with features of the invention, the cable card includes control and status registers accessible to firmware in the system unit, and a wire engine and data engine, the wire engine transmits control and status signals over the cables to both a corresponding wire engine and data engine in the IO enclosure, and the data engine transmits command and response messages and data for management communications between the system firmware and a management controller firmware within the IO enclosure. The wire engine and data engine in the IO enclosure receives control signals from and provides status to the system unit wire engine, and receives command messages and data and transmits response messages and data to the system unit data engine.

In accordance with features of the invention, the control and status signals implemented in the wire engine and data engine and exchanged between the system unit and IO enclosure for purposes of determining or establishing enclosure states including status by which system firmware can determine if either cable is present on the system cable card, and to determine whether either cable on the system cable card is connected to the enclosure; status by which system firmware can determine which cable position each of the pair of cables from the cable card connects to on the IO enclosure, enabling firmware to detect incorrect cross-cabling between the cable card ports and ports on the IO enclosure; status by which system firmware can determine which type of IO module the cables connect to including a single slot within a module, referenced as a Direct Slot module, or a module that expands through a PCIE switch to multiple slots referenced as a Fan-out Module; hardware control signals from the cable card to the IO enclosure to automatically initiate power on to full power when the cable card has full power, and similarly to power off the enclosure when the system cable card powers off; and control signals that facilitate system firmware transferring commands, data, and responses utilizing the industry standard I2C bus, and transferring this data across the cables transparently to system firmware utilizing the data engine.

In accordance with features of the invention, system firmware detects cable cards present in PCIE slots within the system unit as part of system boot and with PCIE hot plug power on detection and initialization of PCIE buses.

In accordance with features of the invention, system and management controller firmware utilize the sideband control structure to perform enclosure management operations and to utilize the redundant paths provided with a pair of cables.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product implement sideband control structure for Peripheral Component Interconnect Express (PCIE or PCI-Express) PCIE cable cards and input/output (IO) expansion enclosures in a computer system.

Figure 1:
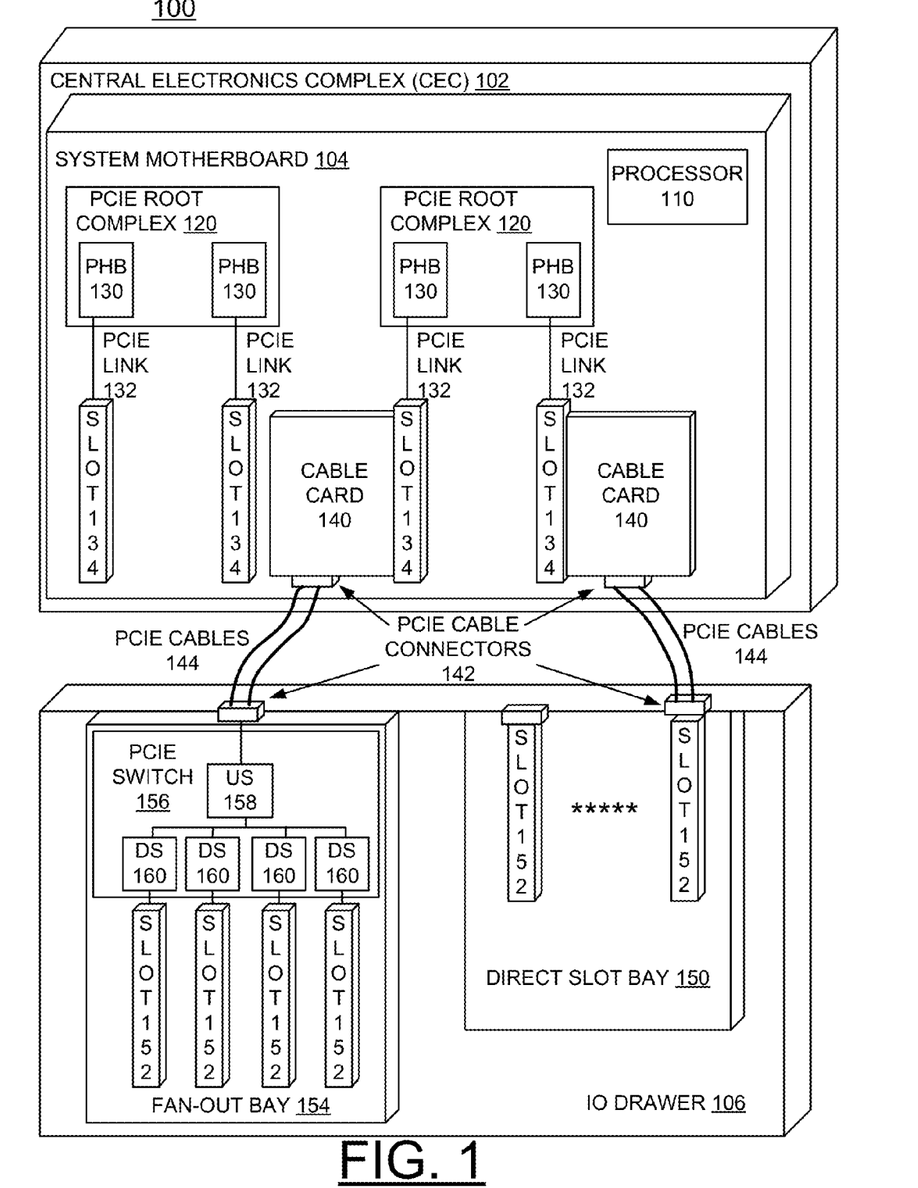
FIG. 1 illustrates an example computer system for implementing sideband control structure for Peripheral Component Interconnect Express (PCIe or PCI-Express) PCIe cable cards and input/output (IO) expansion enclosures in accordance with a preferred embodiment.

Having reference now to the drawings, in FIG. 1, there is shown an example computer system generally designated by the reference character 100 for implementing sideband control structure for Peripheral Component Interconnect Express (PCIE or PCI-Express) PCIE cable cards and input/output (IO) expansion enclosures in accordance with a preferred embodiment. Computer system 100 includes a computer Central Electronics Complex (CEC) 102 that includes a system motherboard 104 common in the art that provides for the physical packaging interconnection of the various components illustrated within the CEC 102. Computer system 100 includes an input/output (IO) expansion enclosure or IO drawer generally designated by the reference character 106 in accordance with a preferred embodiment.

In accordance with features of the invention, the IO drawer 106 is an electrical enclosure that provides PCIE add-in card slots (PCIE slots) or integrated devices utilized by firmware and software operating within the CEC 102 to extend the number of PCIE devices physically configurable within the scope of the CEC.

CEC system motherboard 104 includes one or more processors or central processor units (CPUs), such as processor 110. Processor 110 is suitably arranged for executing firmware and software, such as operating system and applications hosted by respective operating systems in control of the overall computer system 100 in accordance with a preferred embodiment.

CEC system motherboard 104 includes one or a plurality of PCIE root complexes 120. Each PCIE root complex 120 includes one or a plurality of PCIE host bridges (PHBs) 130, each PHB 130 providing a respective PCIE link 132 to a respective PCIE slot 134 mounted commonly on the system motherboard 104. For example, the PCIE link 132 is comprised of a plurality of 16 lanes of PCIE signaling wires and auxiliary signals, such as specified in the PCIE standard. The auxiliary signals include PCIE PERST, also called Fundamental Reset, and PCIE clocks from the PHB to a PCIE device, PCIE card present from a device to a PHB, and other such discrete signals that operate independently of the PCIE signaling lanes.

One or more of the PCIE slots 134 includes a respective PCIE cable card 140 including a respective PCIE cable connector 142 connected by a pair of PCIE cables 144 to a corresponding respective PCIE cable connector 142 provided with the IO drawer 106, as shown.

IO drawer 106 includes one or a plurality of module bays, such as a direct slot bay 150 including a plurality of PCIE slots 152, and a fan-out bay 154, including a PCIE switch 156 connected to another plurality of PCIE slots 152, as shown. Each of the direct slot bay 150, PCIE slots 152, and the fan-out bay 154 is connected to the CEC 102 by the individual and independent cables 144 via PCIE cable connectors 142, as shown. The PCIE switch 156 includes an upstream port 158 connected upstream to the PCIE Cable Connector 142 and downstream to a plurality of downstream ports 160, each connected to a respective PCIE slot 152, as shown.

Computer system 100 is shown in simplified form sufficient for understanding the present invention. The illustrated computer system 100 is not intended to imply architectural or functional limitations. The present invention can be used with various hardware implementations and systems and various other internal hardware devices.

In accordance with features of the invention, one or a plurality of cables 144 is provided with each cable card 140 and respective PCIE slot 152 or PCIE switch 156. As shown, a pair of PCIE cables 144 convey PCIE signal lanes and auxiliary signals forming a single PCIE link, and the PCIE cables 144 also convey sideband control and status signals between the CEC 102 and the IO drawer 106. The use of two cables 144 for each single PCIE link between the CEC 102 and IO drawer 106 advantageously enables redundancy in the event of a cable failure. Only a single cable 144 is utilized in communicating sideband controls and status between the CEC and IO drawer, and each of the two cables 144 provides an alternative signaling path to communicate such sideband controls.

In accordance with features of the invention, the cables 144 may be conventional copper cables or fiber optic cables employing opto-electronic transceivers at each cable end. For example, with relatively short distances, such as inches to a few feet, copper cables 144 are generally suitable for conveying PCIE lanes operating at required PCIE signaling rates between the CEC 102 and IO drawer 106. Optical cables 144 advantageously provide electrical isolation to enable high signaling rates over longer distances, such as one to many meters.

In accordance with features of the invention, use of optical PCIE cables 144 includes serializing required DC signals over the optical cables 144 and then converting the serialized signals back to DC signals at the other end of the optical PCIE cables 144 at CEC 102 or the IO drawer 106.

In accordance with features of the invention, firmware operating in the CEC 102 is enabled to determine a type of cable card 140 plugged into a PCIE slot 134, with a plurality of different such cable card types having differing properties, such as whether the cables 144 are copper or optical, how many cables 144 emanate from the cable card 140, and the like. It is similarly advantageous for firmware operating in the CEC 102 to be able to determine whether the cables 144 are actually connected to an IO drawer 106, and what type of IO drawer 106, and the IO module bay 150, or module bay 156, is connected to cables 144.

In accordance with features of the invention, in a logically partitioned computer system 100 firmware operating in the CEC 102 is enabled to assign respective CEC PCIE slots 134 to a particular logical partition when that slot 140 contains a PCIE IO adapter or firmware operating in the CEC 102 is enabled to detect a cable card 140 and to assign respective CEC PCIE slots 152 to different logical partitions with the cable card 140 connected to an IO drawer 106.

Figure 2A:
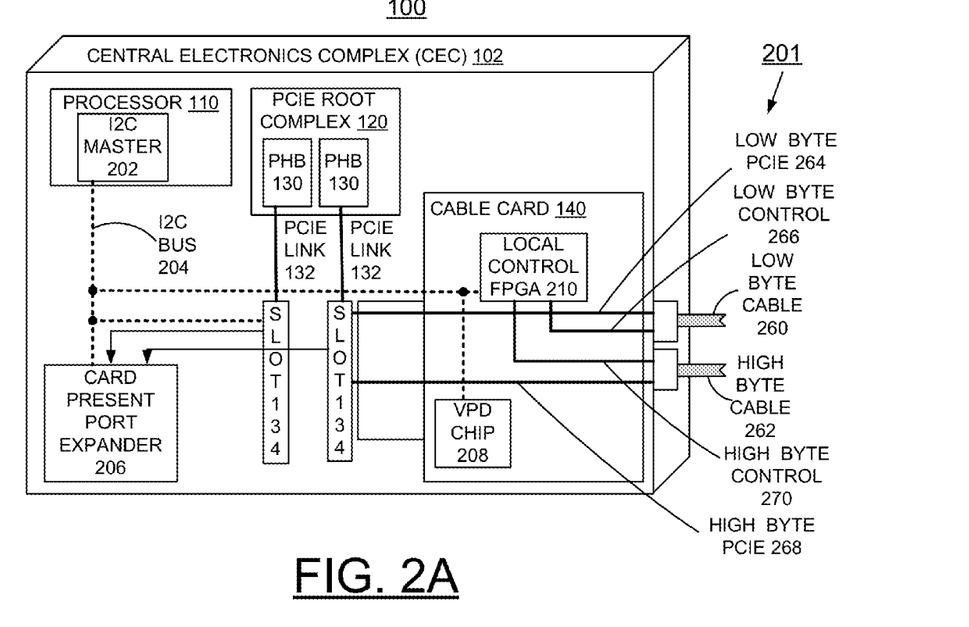
FIGS. 2A, and 2B illustrates novel cable card and sideband controls of the example system of FIG. 1 in accordance with a preferred embodiment.

Referring also to FIGS. 2A, and 2B, additional example details of novel cable card 140 and sideband controls generally designated by the reference character 201 are shown of computer system 100 of FIG. 1 in accordance with a preferred embodiment. As shown in FIG. 2A, included within or accessible to the processor 110 is an Inter-Integrated Circuit (I2C) master device 202, which is the master of an I2C bus 204 utilized as an IO bus of the sideband signaling apparatus of a preferred embodiment. It should be understood that other such IO buses known in the art may be suitable to substitute for the I2C bus 204 utilized by the invention. Within CEC 102, the I2C bus 204 is connected between the I2C master device 202 and a card present port expander 206, PCIE slots 134, a vital product data (VPD) chip 208, and a local control field programmable gate array (FPGA) 210 provided within the cable card 140.

The PCIE cable card 140 utilizes pins within the PCIE connector 142 of the PCIE slot 134 defined in PCIE as reserved pins to generate a signal identifying the PCIE cable card 140 as a cable card. The card present port expander 206 connected on the I2C bus 204 receives a card present signal from the cable card 140 uniquely indicating the presence of a cable card, as opposed to a PCIE IO adapter. Firmware operating in the CEC 102 utilizes the I2C master 202 to read registers within the card present port expander 206 in order to determine that the cable card 140 is plugged in the respective PCIE card slot 134. It should be understood that other devices than the card present port expander 206 could be used to receive cable card present information in a manner accessible to firmware operating within the CEC 102.

The local control FPGA 210 includes registers that receive status from and optionally signal controls to other hardware components located on the cable card 140. The registers within the local control FPGA 210 are connected to the I2C bus 204 proceeding from the PCIE slot 140 onto the cable card 140.

Figure 2B:
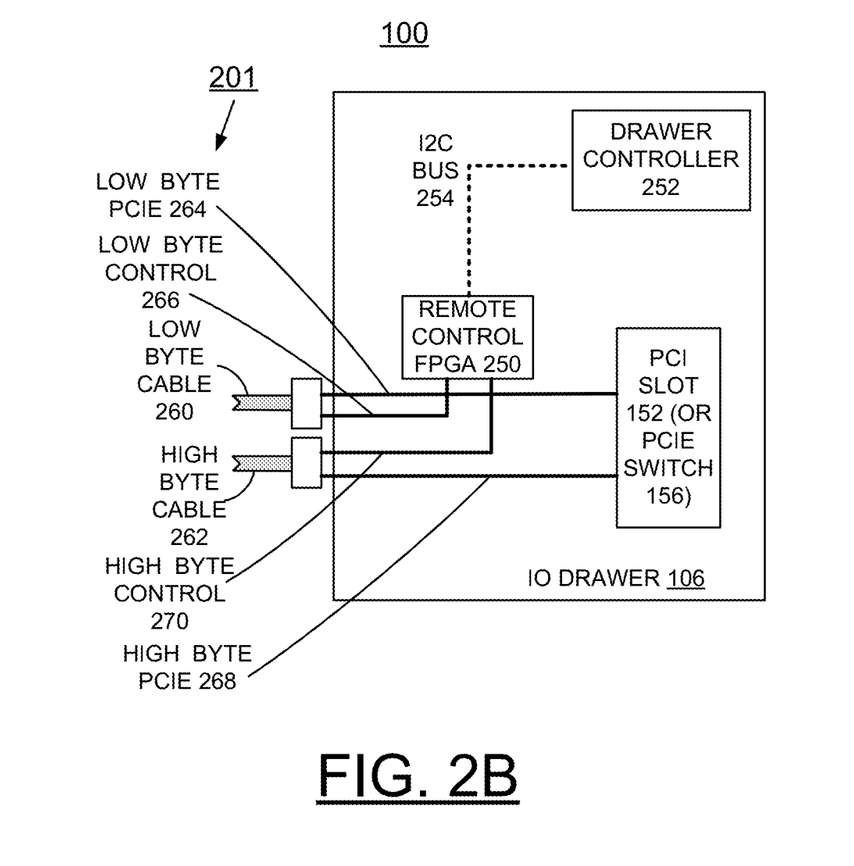

Referring also to FIG. 2B, the IO drawer 106 similarly includes a remote control FPGA 250. The remote control FPGA 250 includes registers that receive signals from other hardware components internal to the IO drawer 106. The IO drawer 106 includes a drawer controller 252 coupled to the remote control FPGA 250 via an I2C bus 254.

In accordance with features of the invention, as shown in FIGS. 2A, and 2B, sideband controls 201 are coupled between the local control FPGA 210 in the CEC 102 and the remote control FPGA 250 in IO drawer 106 by a low byte cable 260 and a high byte cable 262. For example, the low byte cable 260 conveys PCIE lanes 0 through 7 of the PCIE link from the PCIE slot 134, shown as Low Byte PCIE 264, and conveys sideband signals between the cable card 140 and the IO drawer 106, shown as Low Byte Control 266. For example, the high byte cable 262 conveys PCIE lanes 8 through 15 of the PCIE link from the PCIE slot 134, shown as High Byte PCIE 268, and conveys sideband signals between the cable card 140 and the IO drawer 106, shown as High Byte Control 270. For example, the high byte cable 262 serves as an alternate or redundant connection to the low byte cable 260 for the purpose of conveying sideband signals.

Using either the low byte control 266 or high byte control 270, the remote control FPGA 250 signals changes in the states of various hardware components or DC voltage signals within the IO drawer 106 to the local control FPGA 210, which receives these changes in registers accessible to firmware operating in the CEC 102. Similarly, firmware operating in the CEC 102 may set register values in the local control FPGA 210 directed at the remote control FPGA 250 to change the state of hardware components or DC voltage signals within the IO drawer 106.

Using the either the low byte control 266 or high byte control 270, the local FPGA 210 communicates local FPGA 210 register changes to the remote control FPGA 250. The registers within the remote control FPGA 250 connect to the I2C bus 254 within the IO drawer 106. The remote FPGA registers are also accessible as I2C devices from the local control FPGA 210. Firmware operating in the CEC 102 utilizes registers in the local control FPGA 210 to create I2C bus operations transmitted between the local control FPGA 210 and remote control FPGA 250 utilizing the low byte control 266 or high byte control 270. The local control FPGA 210 enables firmware operating within the CEC 102 to determine various configuration and operational states of hardware components or DC voltage signals located on the cable card 210 as well as hardware components or DC voltage signals within the IO drawer 106.

The drawer controller 252 connected to the remote control FPGA 250 within the IO drawer 106 monitors or manages states of the hardware internal to the IO drawer, such as turning on or off power supplies within the drawer, monitoring thermal or electrical states of components within the drawer, taking actions in response to particular thermal or electrical states or thresholds, and the like. The drawer controller 252 connects to the remote control FPGA 250 utilizing the I2C bus 370, enabling the drawer controller 252 to read or write registers within the remote control FPGA 250 and to communicate status to or receive control information communicated from the local control FPGA 210 using the low byte control 266 or high byte control 270.

Figure 3A:
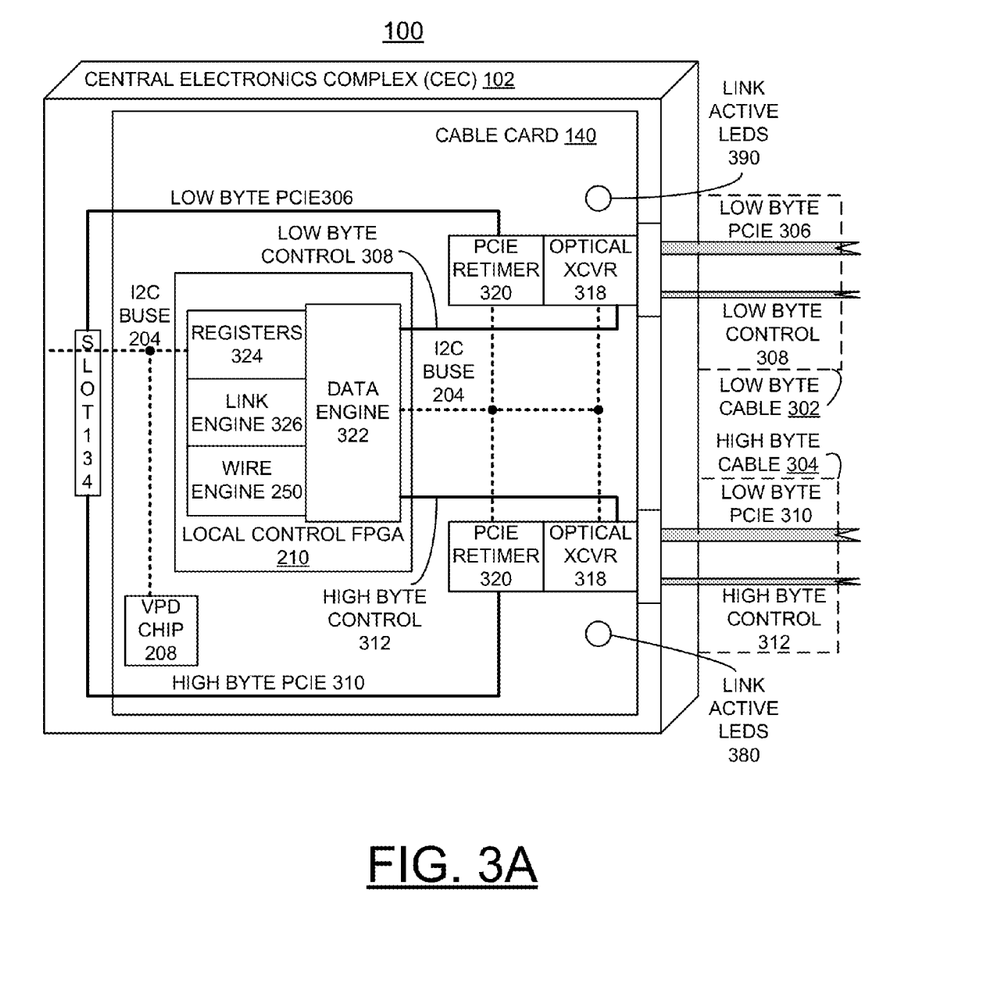
FIGS. 3A, and 3B illustrates further details of novel Local and Remote FPGA Controllers of the example system of FIG. 1 in accordance with a preferred embodiment.
Figure 3B:
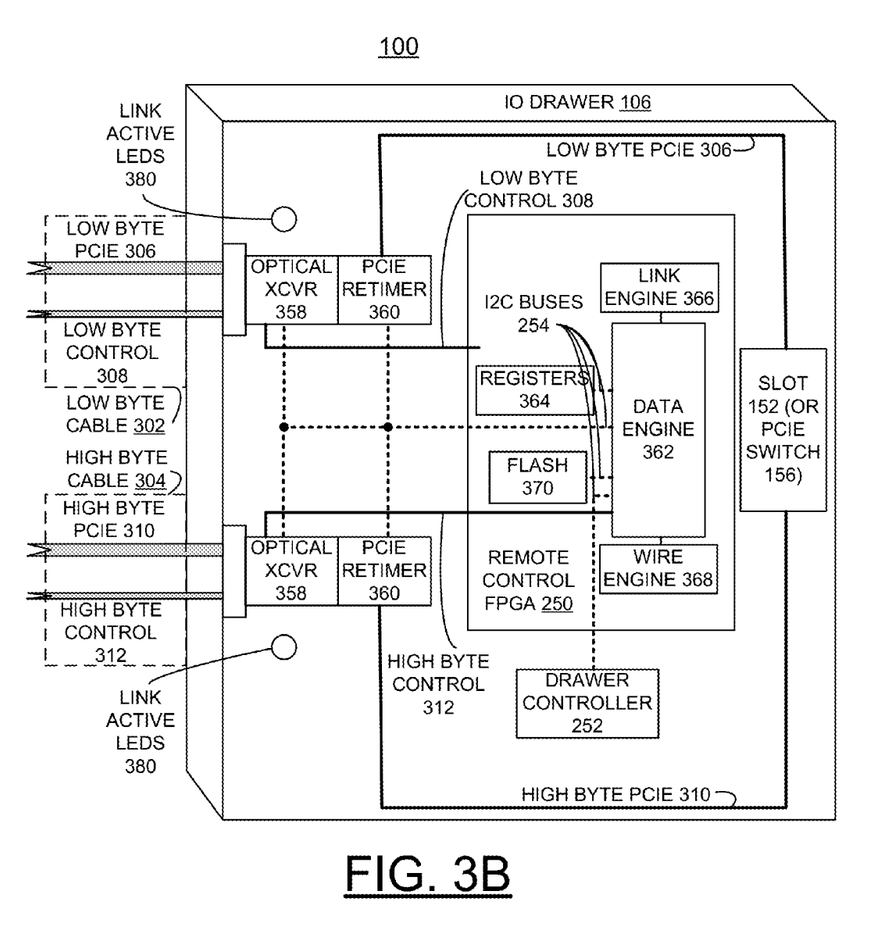

Referring also to FIGS. 3A, and 3B, additional example details of novel local control and remote control FPGAs 210, 250 are shown of the example system 100 of FIG. 1 in accordance with a preferred embodiment.

The cable card 140 is shown connected to the IOA drawer 106 utilizing a low byte cable 302 and a high byte cable 304. The low byte cable 302 conveys the low byte PCIE signals 306 representing PCIE lanes 0 to 7 and control signals between the local FPGA 210 and remote FPGA 250 indicated as low byte control 308. The high byte cable 304 conveys the high byte PCIE signals 310 representing PCIE lanes 8 to 15 and control signals between the local FPGA 210 and remote FPGA 310 indicated as high byte control 312. The signals conveyed by means of the low byte control 308 and high byte control 312 signals may be communicated over either or both of the low byte cable 302 and the high byte cable 304 at any one time, such that each cable can convey the control signals as a backup for the other in the event of failure or disconnection of one cable 302 or 304, and such that signals may be communicated over both cables in order to detect the location to which each cable is connected at the IO drawer 106.

The low byte control 308 and low byte PCIE 306 signals in the low byte cable 302, and the high byte control 312 and high byte PCIE 310 signals in the high byte cable 304 are conveyed optically utilizing a respective optical transceiver (XCVR) 318 on the cable card 140 and optical transceiver (XCVR) 358 in the IO drawer 106. The PCIE lanes 0 to 7 conveyed on the low byte PCIE 306 and lanes 8 to 15 conveyed on the high byte PCIE 310 commonly pass through a respective PCIE re-timer 320, 360 in order to synchronize them with the respective optical transceivers 318, 358.

The local control FPGA 210 on the cable card 140 includes a data engine 322, registers 324, a link engine 326, and a wire engine 328. The remote control FPGA 250 similarly includes a data engine 362, registers 364, a link engine 366, and a wire engine 368, and optionally a flash memory 270 coupled to the data engine 362. The local control FPGA data engine 210 and remote control FPGA data engine 250 are capable of exchanging control signals utilizing either the low byte control 308 or high byte control 312 conveyed over the low byte cable 302 or high byte cable 304, respectively. The link engine 326 utilizes the data engine 322 to establish reliable optical signaling and bit transfer protocols between the optical XCVRs 318 on the cable card 140 and the optical XCVRs 358 and data engine 362 in the IO drawer 106 over both of the low byte cable 302 and high byte cable 304.

The wire engine 328 of local control FPGA 210 receives the state of certain bits of the registers 324 or DC voltage signals and utilizes the data engine 322 to transmit these states to the registers 364 of the remote control FPGA 250. The registers 324 include a predefined bit to assert the state of the PCIE auxiliary PERST DC voltage signal output from a PHB 130 to a device attached to the respective PCIE link, and a bit to receive the state of PCIE auxiliary device present DC voltage signal from a PCIE slot 152 in the IO drawer 106 connected to the PCIE link over the low byte cable 302 and high byte cable 304. When the state of certain bits of registers 324 changes, the wire engine 328 automatically communicates these to registers 364 of the remote FPGA 250. The wire engine 368 of remote control FPGA 250 receives the state of certain bits of the registers 364 or DC voltage signals and utilizes the data engine 362 to transmit these states to the registers 324 of the local control FPGA 210. Whenever the state of these certain bits of registers 364 changes, the wire engine 368 automatically communicates these to registers 324 of the local control FPGA 210.

The respective wire engine 328, 368 on each on each end of the optical cables 302, 304 provide an alternative signaling mechanism for PCIE auxiliary signals or other DC voltage signals with the fiber optic cables to establish or receive the active or inactive state of the auxiliary signals at the respective other end of the cable.

The registers 324 of local control FPGA 210 include bits representing various properties of the cable card 140, such as the type of the cable card itself, the type and connection states of the low byte cable 302 and high byte cable 304. The registers 324 include bits to detect the states of certain hardware inputs from or control the states of certain hardware outputs to the components of the cable card 140. The registers 324 of local control FPGA 210 include bits representing various properties of the cable connections to that IO drawer, such as representing which location on the IO drawer 106 of the low byte cable 302 and high byte cable 304 are connected, to enable firmware to determine that cables are properly connected.

The cable card 140 and the IO drawer 106 optionally includes Link Active LEDs 380 in association with each of the low byte cable 302 and high byte cable 304. Firmware operating in the CEC 102 utilizes bits within the registers 324 of the local control FPGA 210 to active or deactivate the link active LEDs 380 to indicate that the cable is or is not actively transmitting signals between the cable card 140 and IO drawer 106. Firmware operating in the CEC 102 performs other control and communications operations, such as activating or deactivating power to the IO drawer 106, a module 150, or 145, PCIE slots 152, or other components within the IO drawer 106.

Figure 4A:
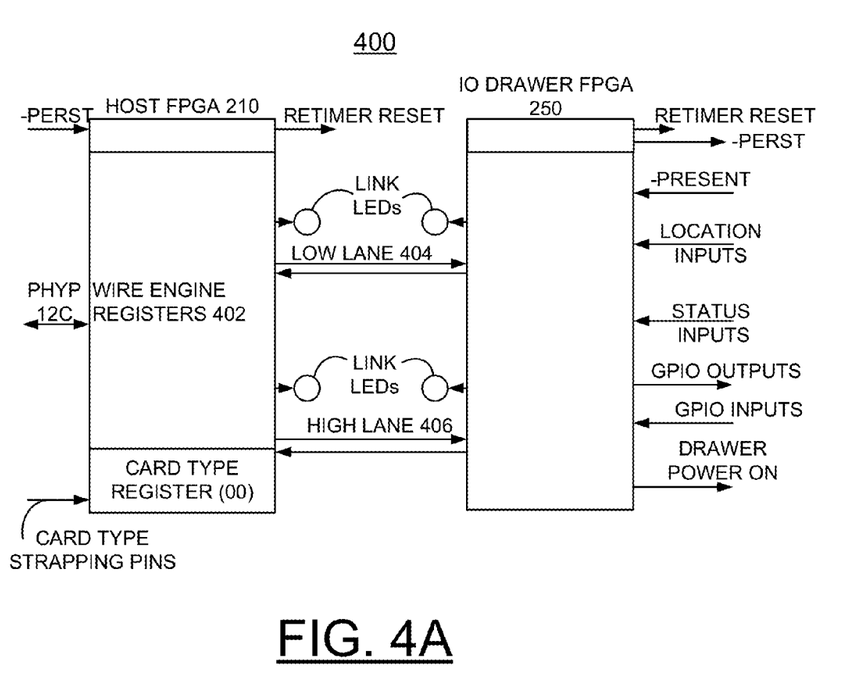
FIGS. 4A, and 4B together illustrates example operational features of wire engine registers at host side wires at IO drawer end of the example system of FIG. 1 in accordance with a preferred embodiment.
Figure 4B:
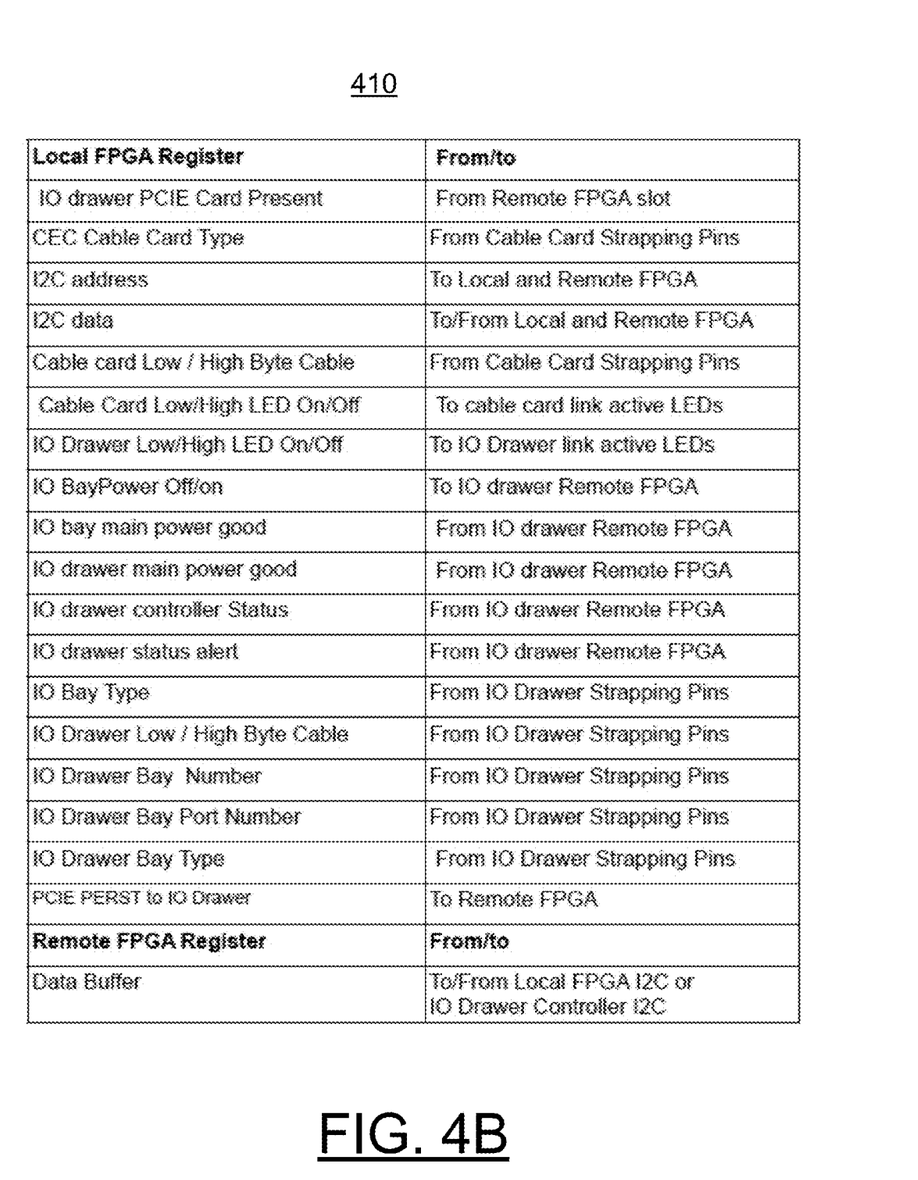

FIGS. 4A, and 4B together illustrate example sideband control operational features at host side FPGA 210 and the IO drawer FPGA 250 of the example system 100 in accordance with a preferred embodiment. In FIG. 4A, example sideband control operational features generally designated by the reference character 400 that include wire engine registers 402 at host side FPGA 210 with example DC voltage control signals at host side FPGA 210 and the IO drawer FPGA 250. A low lane 404 and high lane 406 connect the host side FPGA 210 and the IO drawer FPGA 250. For example, the wire engine is responsible for getting data at local I2C registers at the host side FPGA 210 to output wires on the IO drawer side FPGA 250 as well as input wires on the IO drawer side to I2C register that can be read at the host side, and this engine runs automatically. Any time there is a change to wires or registers on one side, the changed data will immediately be sent to the other side. The side that receives new data will also sent its data back to the other end. For example, 16 bit status and location data is exchanged between the two FPGA 210, 250, and this data also is responsible for getting PERST and PRESENT exchanged.

In FIG. 4B, there are shown example register bits generally designated by the reference character 410. The example register bits 410 include example local FPGA register bits and example remote FPGA register bits that are shown on the left side with corresponding from/to functions shown on right side in FIG. 4B.

Figure 5:
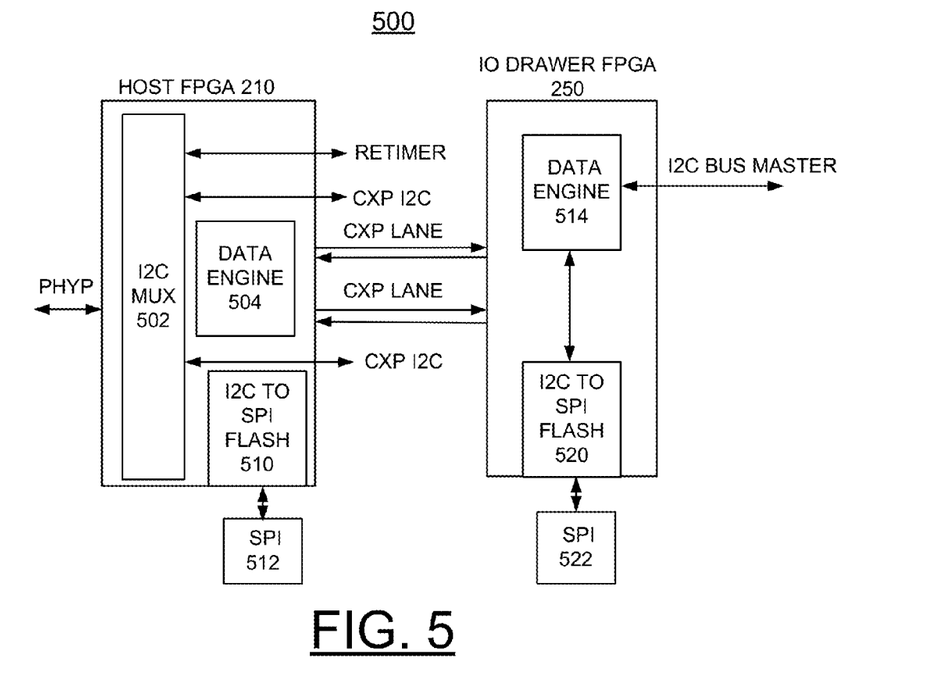
FIG. 5 illustrates example operational features of a physical layer view of I2C multiplexer (MUX) and data engine at host side and IO drawer end of the example system of FIG. 1 in accordance with a preferred embodiment.

Referring to FIG. 5, there are shown example operational features generally designated by the reference character 500 of a physical layer view of the example system 100 of FIG. 1 in accordance with a preferred embodiment. An I2C multiplexer (MUX) 502 and a respective data engine 504, 514 and an I2C SPI flash 510, 520 at host side FPGA 210 and IO drawer side FPGA 250 are shown connected by CXP lanes. A respective SPI 512, 522 is coupled to the I2C SPI flash 510, 520 at host side FPGA 210 and IO drawer side FPGA 250. The I2C multiplexer (MUX) 502 and the respective data engine 504, 514 enable access secondary I2C buses in a consistent manner. The secondary I2C bus 254 could be in the IO drawer 106 talking to the drawer controller 252 or it could be the I2C bus 204 to each of the cable connector.

Figure 6A:
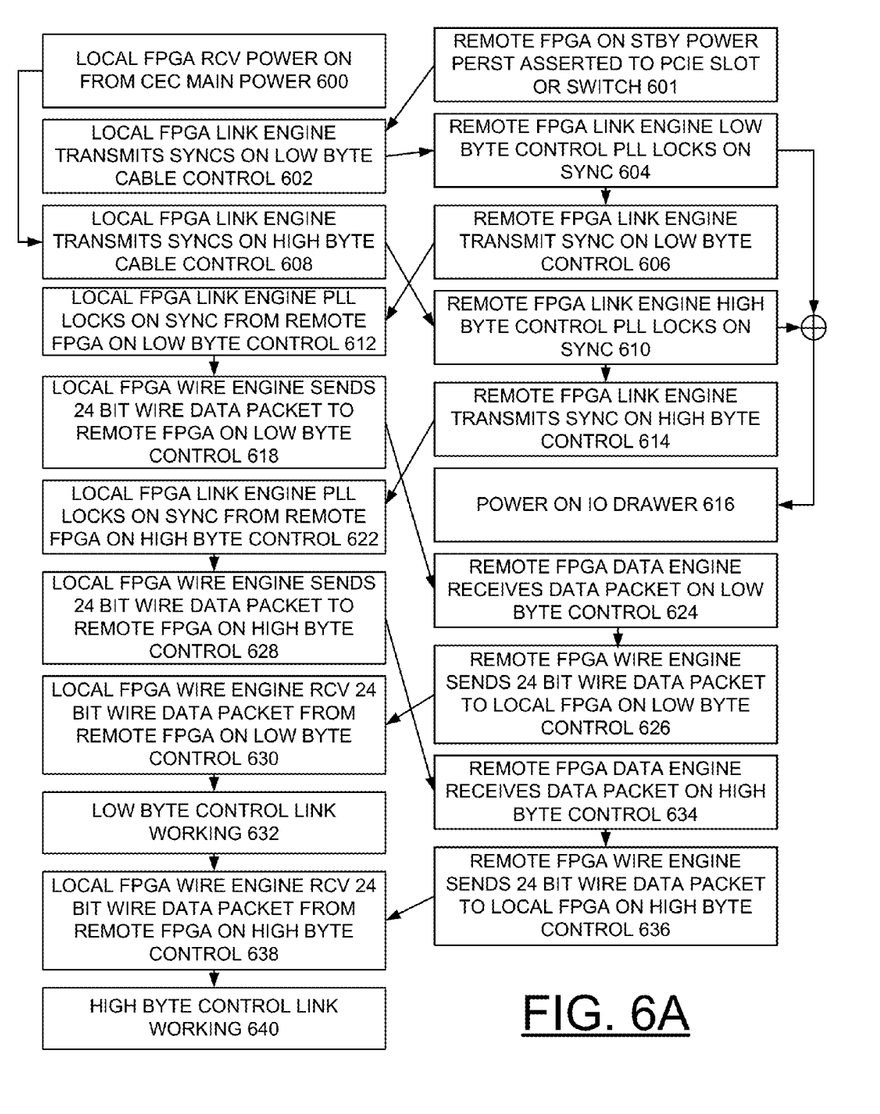
FIG. 6A is a flow chart illustrating example operational features of link start up of the example system of FIG. 1 in accordance with a preferred embodiment.

Referring to FIG. 6A, there is shown a flow chart illustrating example operational features of link start up of the example system 100 in accordance with a preferred embodiment. In FIG. 6A, example operations of local FPGA on the host side or CEC side are shown on the left and example operations of remote FPGA on the IO drawer side are shown on the right.

As indicated in a block 600, the local FPGA receives power on from the CEC main power. As indicated in a block 601, the remote FPGA is on standby power, with PERST asserted to PCIE slot or PCIE switch. The local FPGA link engine transmits sync characters on the low byte cable control as indicated in a block 602. The remote FPGA link engine low byte control PLL locks on sync as indicated in a block 604. The remote FPGA link engine transmits sync on low byte control as indicated in a block 606. The local FPGA link engine transmits syncs on the high byte cable control as indicated in a block 608. The remote FPGA link engine high byte control PLL locks on sync from the local FPGA as indicated in a block 610. The local FPGA link engine low byte control PLL locks on sync from the remote FPGA at block 606 as indicated in a block 612. The remote FPGA link engine transmits sync on high byte control as indicated in a block 614. As indicated in a block 616, power on of the IO drawer is provided responsive to the remote FPGA link engine low byte control PLL locks on sync at block 604 or the remote FPGA link engine high byte control PLL locks on sync from the local FPGA at block 610. After local FPGA link engine low byte control PLL locks on sync from the remote FPGA at block 612, the local FPGA wire engine sends 24 bit wire data packet to remote FPGA on low byte control as indicated in a block 618.

The local FPGA link engine PLL locks on sync from the remote FPGA high byte control transmitted at block 614 as indicated in a block 622. The local FPGA wire engine sends 24 bit wire data packet to remote FPGA on high byte control as indicated in a block 628. As indicated in a block 624, the remote FPGA data engine receives the 24 bit wire data packet sent from the local FPGA wire engine at block 618. As indicated in a block 626, the remote FPGA data engine sends the 24 bit wire data packet on low byte control to the local FPGA wire engine. As indicated in a block 630, the local FPGA wire engine receives the 24 bit wire data packet from the remote FPGA low byte control. As indicated in a block 632, the low byte control link is working. As indicated in a block 634, the remote FPGA data engine receives the 24 bit wire data packet on high byte control from the local FPGA wire engine. As indicated in a block 636, the remote FPGA data engine sends the 24 bit wire data packet on high byte control to the local FPGA wire engine. As indicated in a block 638, the local FPGA wire engine receives the 24 bit wire data packet from the remote FPGA on high byte control. As indicated in a block 640, the high byte control link is working.

Figure 6B:
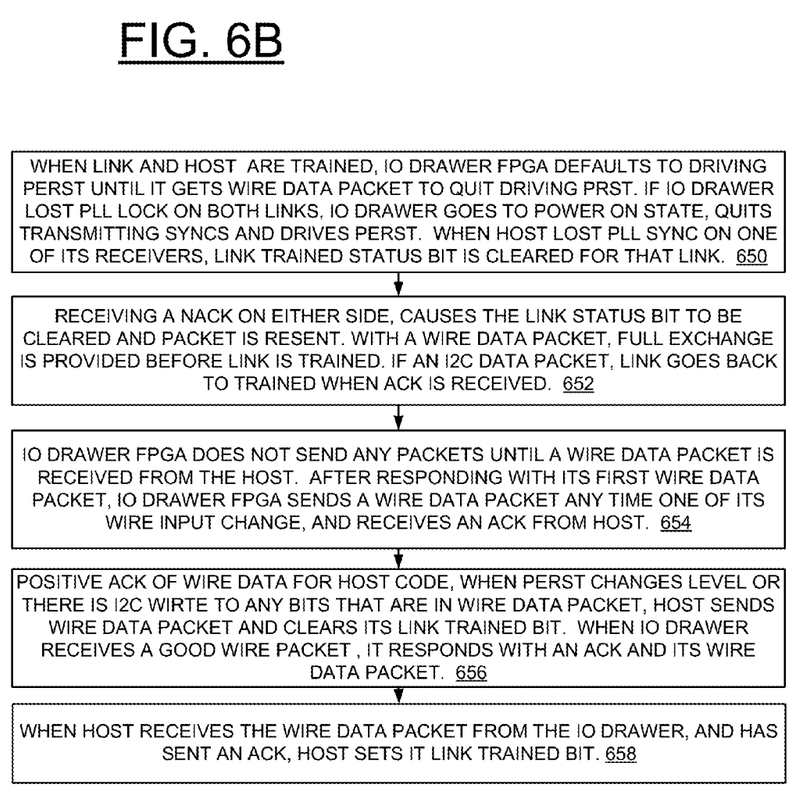
FIG. 6B is a flow chart illustrating example link operational features of the example system of FIG. 1 in accordance with a preferred embodiment.

Referring to FIG. 6B, there is shown a flow chart illustrating example link operational features of the example system 100 in accordance with a preferred embodiment. As indicated in a block 650, when link and hose are trained such as shown in FIG. 6A, the IO drawer FPGA defaults to driving PERST to the PCIE link until it gets a wire data packet that says to quit driving PERST. If the IO drawer lost PLL lock on both links, the IO drawer goes again to power on state, quits transmitting syncs and drives PERST at bock 650. When host lost PLL sync on one of its receivers, link trained status bit is cleared for that link at block 650.

As indicated in a block 652, receiving a negative acknowledge (NACK) on either side, causes the link status bit to be cleared and packet is resent. With a wire data packet, full exchange is provided before the link is trained. With an I2C data packet, the link goes to trained when acknowledge (ACK) is received.

As indicated in a block 654, the IO drawer FPGA does not send any packets until a wire data packet is received from the host FPGA. After the IO drawer FPGA has responded with its first wire data packet, the IO drawer FPGA will send a wire data packet any time one of its wire input change, and receives an ACK from the host.

As indicated in a block 656, a positive ACK of wire data for host code when PERST changes level or there is an I2C write to any bits that are in the wire data packet, the host sends a wire data packet and clear its link trained bit. When the IO drawer receives a good wire packet it always responds with an ACK and its wire data packet.

As indicated in a block 658, when the host receives the wire data packet from the IO drawer and has sent an ACK, the host sets its link trained bit.

Figure 7:
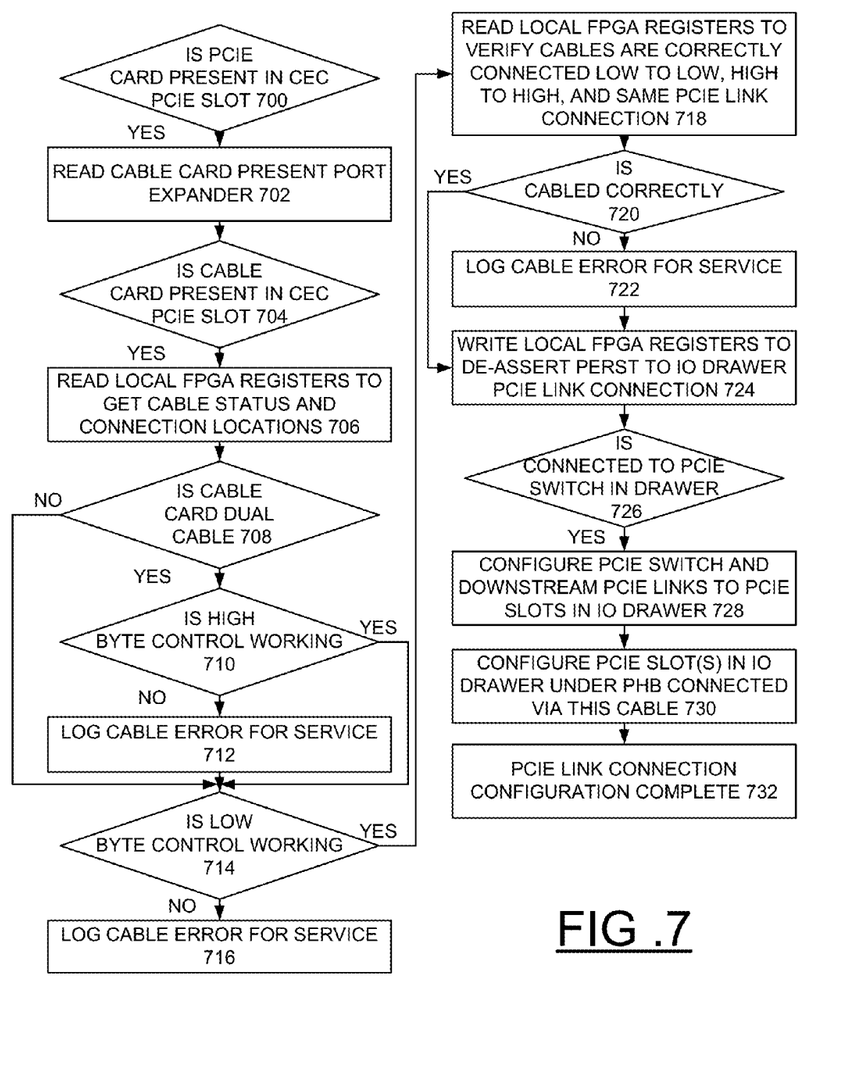
FIG. 7 is a flow chart illustrating example firmware operational features using sideband status information of the example system of FIG. 1 in accordance with a preferred embodiment.

Referring to FIG. 7, there is shown a flow chart illustrating example firmware operational features using sideband status information of the example system 100 in accordance with a preferred embodiment.

As indicated in a decision block 700, checking for a PCIE card present in CEC PCIE slot is performed. When a PCIE card is present in CEC PCIE slot, the cable card present port expander is read as indicated in a block 702. As indicated in a decision block 704, again checking for the PCIE cable card present in CEC PCIE slot is performed.

When a PCIE cable card is present in CEC PCIE slot, the local FPGA registers are read to get cable status and connection locations as indicated in a block 706. Checking if the cable card includes a pair of cables or dual cables is performed as indicated in a decision block 708. When the cable card includes dual cables, checking is performed to determine if the high byte control is working as indicated in a decision block 710. If the high byte control is not working, a cable error is logged for service as indicated in a block 712. If the high byte control is working and when the cable card does not include dual cables, checking is performed to determine if the low byte control is working as indicated in a decision block 714. If the low byte control is not working, a cable error is logged for service as indicated in a block 716.

As indicated in a block 718, local FPGA registers are read to verify cables are correctly connected low to low, high to high, and same PCIE link connection at the IO drawer. Checking if cabled correctly is performed as indicated in a decision block 720. If not cabled correctly, a cable error is logged for service as indicated in a block 722. If cabled correctly, the local FPGA registers are written to de-assert PERST to the IO drawer PCIE link connection as indicated in a block 724. Checking is performed to determine if connected to PCIE switch in IO drawer as indicated in a decision block 726. When connected to PCIE switch in IO drawer, the PCIE switch and downstream PCIE links to PCIE slots in the IO drawer are configured as indicated in a block 728. The PCIE slot or PCIE slots in the IO drawer under the PHB connected to this cable are configured as indicated in a block 730. The PCIE link connection configuration is complete as indicated in a block 732.

Figure 8:
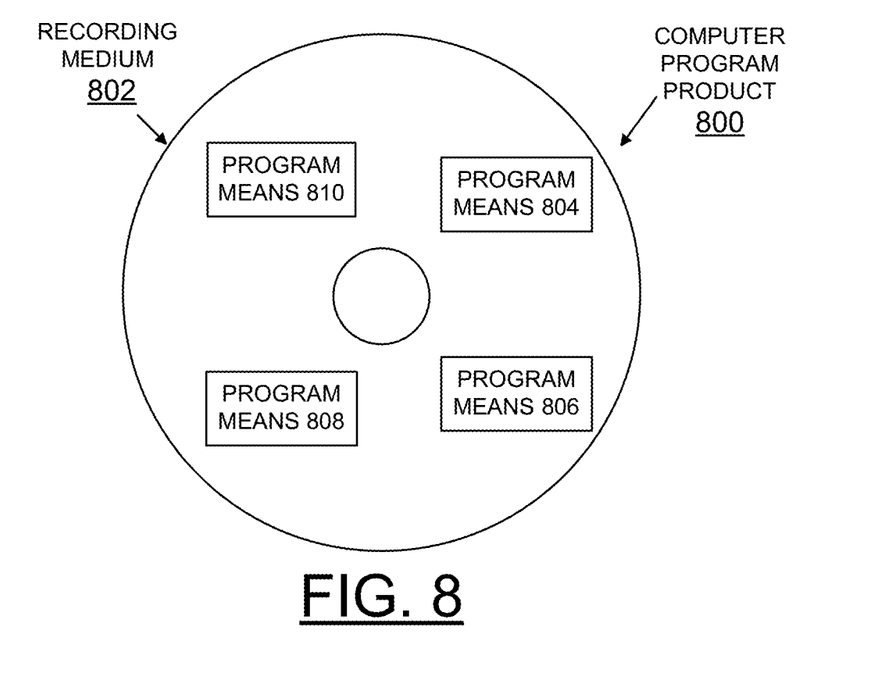
FIG. 8 is a block diagram illustrating a computer program product in accordance with the preferred embodiment.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods for implementing sideband control structure for PCIE cable cards 140 and IO expansion enclosures 106 of preferred embodiments in the system 100 of FIG. 1.

A sequence of program instructions or a logical assembly of one or more interrelated modules defined by the recorded program means 808, 806, 808, and 810, direct the computer system 100 for implementing sideband control structure for PCIE cable cards 140 and IO expansion enclosures 106 of a preferred embodiment.

While the present invention has been described with reference to the details of the embodiments of the invention shown in the drawing, these details are not intended to limit the scope of the invention as claimed in the appended claims.

What is claimed is:

1. A method for implementing sideband control structure for Peripheral Component Interconnect Express (PCIE) cable cards and input/output (IO) expansion enclosures in a computer system, comprising:
    providing a Central Electronics Complex (CEC) including a processor and system firmware for uniquely identifying a cable card present in a PCIE slot in a system unit;
    providing the cable card including control and status registers accessible to said system firmware, a system unit link engine, a system unit wire engine and a system unit data engine;
    providing an IO enclosure including corresponding control and status registers, a corresponding link engine, a corresponding wire engine and a corresponding data engine;
    providing a respective first PCIE cable connector connected to a respective second PCIE cable connector by a respective pair of PCIE cables connecting between the cable card and the IO enclosure;
    providing sideband control signaling for implementing enclosure and PCIE link management functions utilizing sideband control paths integrated within the respective pair of PCIE cables, and providing PCIE signaling lanes within the respective pair of PCIE cables and each cable of the respective pair of PCIE providing an alternative signaling path for communicating sideband controls;
    said system unit wire engine, transmitting control and status signals over the PCIE cables to both said corresponding wire engine and data engine in the IO enclosure, and said system unit data engine, transmitting command and response messages and data for management communications between said system firmware and a management controller firmware within the IO enclosure; and
    said wire engine and data engine in the IO enclosure, receiving control signals from and providing status to said system unit wire engine, and receiving command messages and data and transmitting response messages and data to said system unit data engine.

2. The method as recited in claim 1, includes providing the respective pair of PCIE cables connecting between the cable card and the IO enclosure, enabling redundancy for both the PCIE link and the sideband control path, in the event of failure of one PCIE cable.

3. The method as recited in claim 1, includes implementing said control and status registers, said link engine, wire engine and data engine with a local control field programmable gate array (FPGA) in the cable card, and implementing said registers, said corresponding link engine, wire engine and data engine with a remote control FPGA in the IO enclosure.

4. The method as recited in claim 1, includes the link engine transmitting sync characters over the cables to the corresponding link engine in the 10 enclosure for establishing communication signaling over the cables.

5. The method as recited in claim 4, includes the data engine transmitting command and response messages and data for management communications between the system firmware and a management controller firmware within the IO enclosure.

6. The method as recited in claim 5, includes the wire engine and data engine in the IO enclosure receiving control signals from and providing status to the system unit wire engine, and receiving command messages and data and transmitting response messages and data to the system unit data engine.

7. The method as recited in claim 1, includes the wire engine and data engine exchanging control and status signals between the system unit and IO enclosure for establishing enclosure states.

8. The method as recited in claim 7, includes providing control signals from the cable card to the IO enclosure to automatically initiate power on, and to power off the enclosure.

9. The method as recited in claim 7, includes providing control signals from the cable card to the IO enclosure to identify respective pair of PCIE cables connecting between the cable card and the IO enclosure, to train one or more PCIE links and transfer data across the one or more PCIE links transparently to system firmware utilizing the data engine.

10. The method as recited in claim 1, wherein providing system firmware for uniquely identifying a cable card present in a PCIE slot in a system unit includes system firmware provides cable card detection with system boot and with PCIE hot plug power on detection and initialization of PCIE links.

* * * * *